Figure 1:
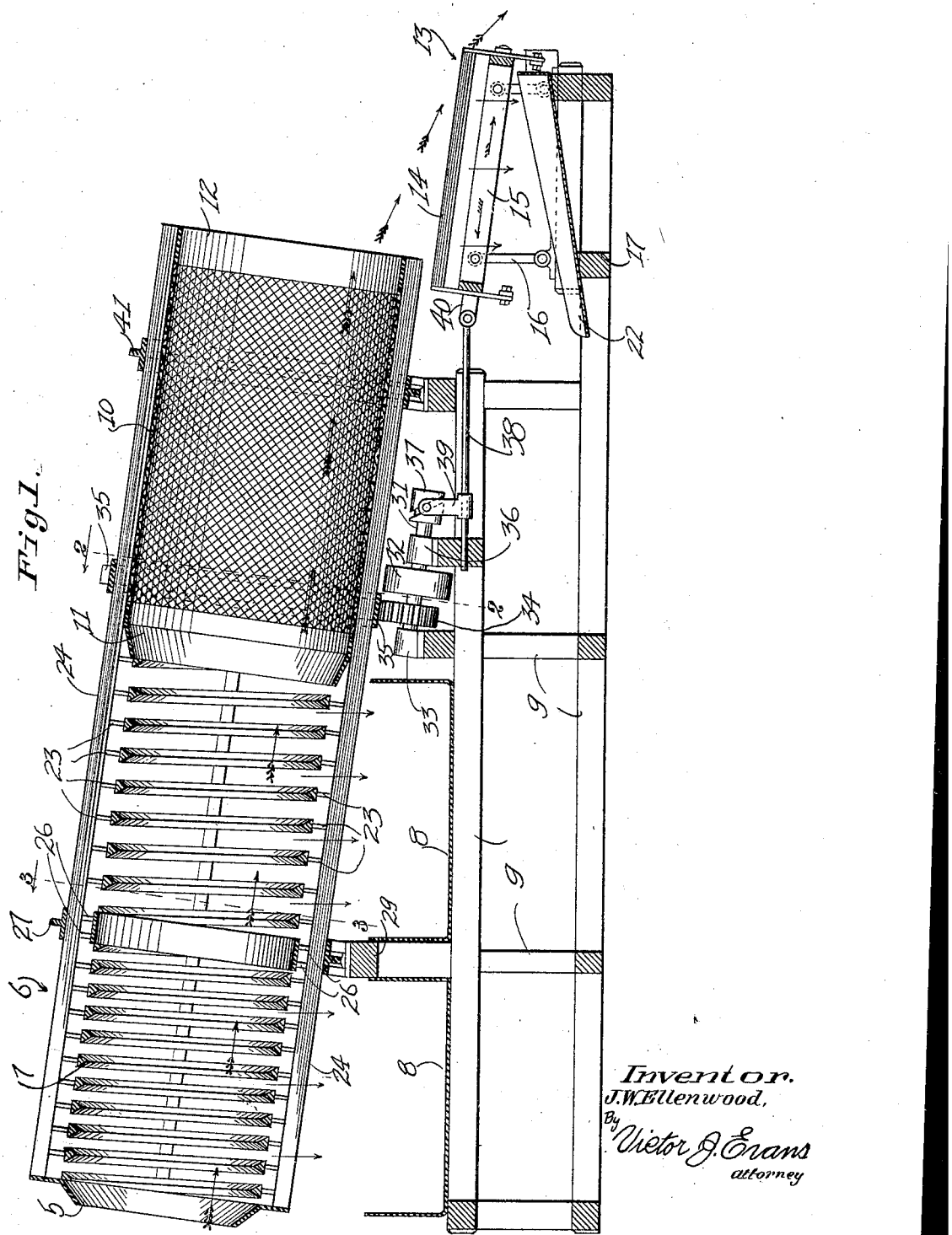

Mar. 27, 1923.
J. W. ELLENWOOD
GRADING APPARATUS
Filed July 8, 1921
1,450,145
2 sheets-sheet 2
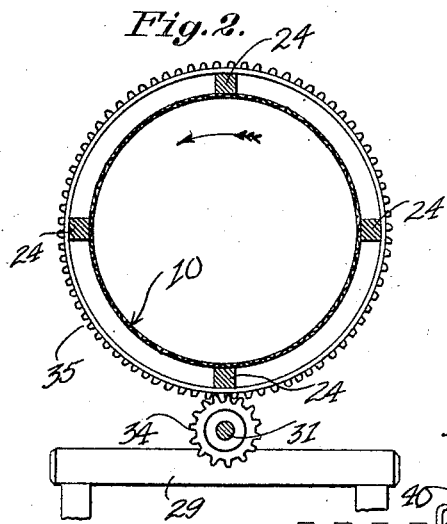
Fig. 2.
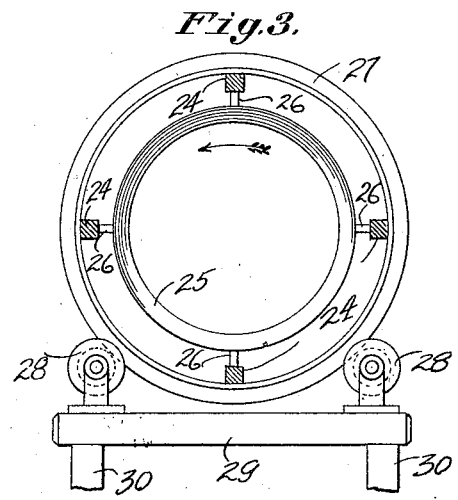
Fig. 3.
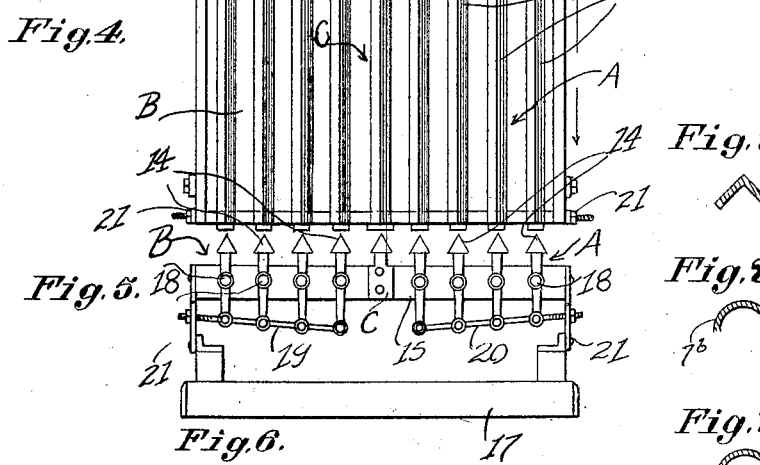
Fig. 4. Fig. 5. Fig. 6. Fig. 7. Fig. 8.
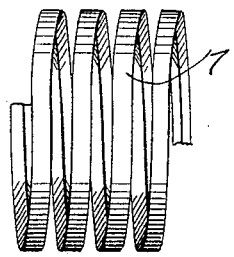
Fig. 7.
Inventor.
J. W. Ellenwood.
By Victor J. Evans
Attorney Patented Mar. 27, 1923.

1,450,145

UNITED STATES PATENT OFFICE.

JAY W. ELLENWOOD, OF PACIFIC GROVE, CALIFORNIA.

GRADING APPARATUS.

Application filed July 8, 1921. Serial No. 483,300.

*To all whom it may concern:*

Be it known that I, JAY W. ELLENWOOD, a citizen of the United States, residing at Pacific Grove, in the county of Monterey and State of California, have invented new and useful Improvements in Grading Apparatus, of which the following is a specification.

The present invention relates to an improved apparatus for grading fish, fruit, vegetables and other products which are marketed with a valuation reckoned according to size.

The primary object of the invention is to produce an apparatus which will be capable of handling large quantities of fish, fruits, vegetables as the case may be, with the greatest of grading accuracy and with a minimum operating cost.

The invention provides other features which will appear as the description proceeds, with reference to the accompanying drawings, which illustrate an example of how the apparatus may be reduced to practice.

In the accompanying drawings forming a part of this specification, and in which like numerals are employed to designate like parts throughout the same, Fig. 1 is a longitudinal section through the grading cylinder of the apparatus and its associated parts, Fig. 2 is a cross section on the line 2—2 of Fig. 1, Fig. 3 is a cross section on the line 3—3 of Fig. 1, Fig. 4 is a plan view of the riddle employed in conjunction with the grading cylinder, Fig. 5 is an end view of the riddle, Fig. 6 is a perspective view of a short length of the coiled grading ribs, Figs. 7, 8 and 9 are detail views of different shaped grading ribs which may be used instead of those shown on the other figures.

In carrying out the invention, fish or commodity to be graded or separated according to size or dimension, are conveyed, shoveled or otherwise introduced into the inverted cone shaped end 5 of the cylinder grader 6 where they are subjected to a revolving movement due to the rotation of the cylinder. This revolving movement coupled with the downward slanting angle at which the cylinder is supported will be conducive to feed the fish toward the opposite end of the cylinder in a more or less agitated mass. The cylinder being composed primarily of continuous coiled grading ribs 7 dividing the cylinder for most of its length in an unbroken series of spirals with spaces between them through which the fish or other product handled drop from the cylinder into pans 8 which are supported below the grader by the frame members of the base 9 which also provides a mounting for the grader.

The spiral ribs 7 are disposed one to the other with their spirals at slightly different angles to the axis of the cylinder so as to leave the spaces between them gradually increasing in width from the receiving end of the cylinder. With this construction the smaller fish, fruits, or vegetables as the case may be are dropped out first with only the larger ones remaining at the end of the coil. Those remaining are then handled through the feeding screen 10 which is also cylindrical in shape with the receiving end 11 thereof having an inverted conical opening which, with the movement of the screen in rotating will present the fish head first through the feeder screen and likewise discharge it from the open end 12.

Positioned adjacent the discharge end 12 of the cylinder is a slanting riddle 13 consisting of a plurality of parallel ribbed members 14 each having an inverted V shaped head and positioned lengthwise of the cylinder and practically at the same slanting pitch.

These ribbed members are arranged in two series A and B, Fig. 5, each series together with a fixed intermediate or middle member C being carried upon a four sided shaker frame 15 which in turn is pivotally mounted by rocker arms 16 mounted upon a base 17. Each series A and B are preferably pivotally mounted to the front and back sides of the frame so that each one of the members has a separate mounting as indicated at 18. The length of the members in each series increases towards the middle member C as shown. The lower ends of the members are further pivotally connected by separate pivots to control or adjust rods 19 and 20 so that each series has an adjusting rod which is common to all of the members in the series which it is intended to control or adjust. By this means the width of openings of the series may be collectively adjusted when occasion demands. The ends of these rods are threaded through the sides of the shaker frame with nuts 21 for maintaining the desired adjustment.

As the fish are discharged upon the riddle, those of certain sizes fall through the spaces between the ribbed members and into a pan 22 where they may be conveyed away. Those that do not fall through will fall off the end onto a pan or other suitable receptacle.

The cylinder may be constructed in any suitable manner likewise the details of the coil grader per se; for instance in Figures 7, 8 and 9 various shaped cross sections of the same are illustrated as $7^a$, $7^b$ and $7^c$. It is naturally important that the frame of the cylinder does not obstruct the grading spaces between the coils therefore each coil is braced as spaced intervals around its circumference by web pieces 23 which are of a thickness less than that of the thickness of the spirals of the coil and the same extend radially with their ends fixed to relatively narrow longitudinal runners 24 that extend from end to end of the cylinder. Arranged midway of the length of the coiled ribs is an annular band 25 which is fixed to the runners 24 by web pieces 26 which are arranged in pairs at intervals around the cylinder corresponding to the runners. Co-axially positioned relatively to the band 25 but on the outside of the cylinder is a continuous ring 27 which is directly supported to revolve in the grooved wheels 28 mounted upon the horizontal bridge 29 of the upright extensions 30 of the frame 9. This structure will guide and steady the forward elevated end of the cylinder.

A suitable driving means for revolving the cylinder may be arranged by the driver shaft 31, including a pulley 32 mounted thereon and adapted to be driven from any convenient power source. The shaft 31 is grounded at on end as at 33 with a drive pinion 34 in mesh with a band gear 35 encircling screen part of the cylinder, the same being fixed to the cylinder through the runners 24. A second journal 36 is made for the shaft 31. Carried on the exposed end of the shaft is a head 37 having a continous groove cut at an angle to the axis of rotation of the shaft so as the same may convert the rotary movement of the shaft into a reciprocating movement to the connecting rod 38 which imparts the shaking movement to the riddle 13. The rod is connected to the head 37 by inverted V-links 39, one of which has a pin seated in the groove in the head, the opposite link acting as a guide. The opposite end of the rod is connected to the riddle as at 40.

The discharging end of the cylinder is properly supported and guided by a duplication of the annular ring structure aforementioned and in this particular instance identified as at 41.

Where the word fish is used in the subjoined claim to represent the products handled by the apparatus it is of course understood that this term is used only for convenience and the use of the invention should in no way be constructed as limited only for handling fish alone.

It is to be understood that the form of my invention herewith shown and described, is to be taken as a preferred example of the same, and that various changes in the shape, size and arrangement of parts may be resorted to without departing from the spirit of the invention or the scope of the subjoined claim.

Having thus described my invention I claim:—

In an apparatus of the character described, the combination of a revolving inclined cylinder having an open receiving and discharging end, supporting means for said cylinder, means for rotating said cylinder, a coil mounted within said cylinder, said coil being formed of material having a triangular cross-section with one of the apexes directed toward the interior of said coil, the convolution of said coil increasing in spaced relation one to the other from the receiving end toward the discharging end, a screen adapted to receive material from said coil and discharge said material at its opposite end, a riddle comprising a reciprocating frame, a series of spaced parallel ribs mounted thereon, a central bar rigidly supported on said frame, the other of said bars being pivotally attached to said frame, means for adjusting said bars with respect to each other and means for reciprocating said frame simultaneously with the rotation of said cylinder and coil.

In testimony whereof I affix my signature.

JAY W. ELLENWOOD